United States Patent [19]

Welker

[11] 4,395,016
[45] Jul. 26, 1983

[54] AXIAL FLOW REGULATOR IMPROVEMENTS INCLUDING RESTRICTOR

[75] Inventor: Robert H. Welker, Sugar Land, Tex.

[73] Assignee: Welker Engineering Company, Sugar Land, Tex.

[21] Appl. No.: 251,206

[22] Filed: Apr. 6, 1981

[51] Int. Cl.³ .................. F16K 7/07; F16K 47/14
[52] U.S. Cl. .................................. 251/5; 251/118; 137/269
[58] Field of Search .................. 251/118, 5; 137/269

[56] References Cited

U.S. PATENT DOCUMENTS 3,467,131  9/1969  Ratelband ..................... 137/269
3,838,704 10/1974  Johnson ........................ 251/5 X
4,135,550  1/1979  Andersson ................. 251/118 X

FOREIGN PATENT DOCUMENTS 210521  2/1924  United Kingdom ............... 251/5

Primary Examiner—Arnold Rosenthal
Attorney, Agent, or Firm—Gunn, Lee & Jackson

[57] ABSTRACT

For use in an axial flow regulator which has an expandable sleeve changing the annular flow space around a central plug barrier to thereby moderate flow, a restricter which is installed to limit capacity. In the preferred and illustrated embodiment, the restricter defines a maximum flow through the apparatus which is calculated relative to the 100% capacity, and wherein the restricter comprises a means which fit next the flow regulator with an encircling cylindrical shoulder for anchoring purposes. It includes a transverse solid wall member. The transverse member is contoured to match cooperative equipment and to bolt to it. Moreover, the restricter is drilled with holes which regulate the flow capacity of the restricter and hence the axial flow regulator.

4 Claims, 1 Drawing Figure

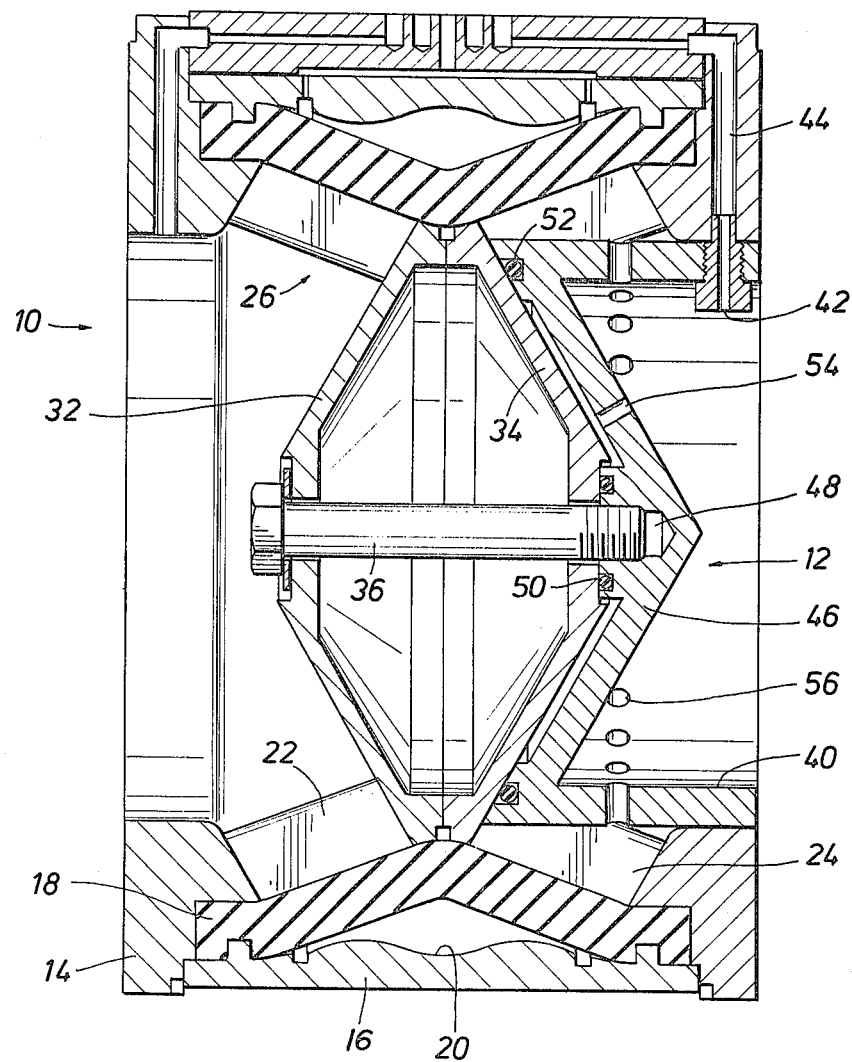

AXIAL FLOW REGULATOR IMPROVEMENTS INCLUDING RESTRICTOR

BACKGROUND OF THE DISCLOSURE

An axial flow regulator is provided by the American Meter Division of Singer Company. This equipment typifies an axial flow regulator. Briefly, this flow regulator incorporates a flange supported housing fitting in a pipeline. In the flange, there are ports for introducing fluid under pressure to expand a sleeve. A sleeve is clamped so that the outer face of the sleeve is exposed to fluid under pressure. This is to force the sleeve to expand. The sleeve expands radially inwardly to throttle an annular flow space around a central barrier. The central barrier is a somewhat streamlined plug positioned axially in the passage which diverts the fluid flow into the annular space adjacent to the sleeve. An important reason for equipping a regulator to flow less than 100% is to keep from having to install an oversized and expensive relief valve, i.e., the relief valve must be able to handle the full open capacity of the regulator.

The axial flow regulator exemplified above and others of different manufacture all have a 100% rating. The 100% rating is typically related to the size of the device. It is difficult to obtain devices with a different 100% rating. This difference of course flows from the fact that they are typically manufactured in just a few sizes. In the field, the device must often be throttled. A nominal six inch rated axial flow regulator must, at full opening flow, pass a smaller flow compared to the nominal rating for the device. In this circumstance, the axial flow regulator must be reduced in size. This is difficult except if one choses to manufacture a specially dimensioned version. That is costly to obtain.

This apparatus is an insert which fits within the axial flow regulator to modify the flow of the regulator. In other words, it defines a reduced full open flow capacity. Moreover, the restricter of this disclosure can be modified easily in the field by the simple expedient of drilling more holes in it. The capacity of each hole of a given size is fixed and predictable.

The restricter of this disclosure is an adaptive fitting which cooperates with and seats against an axial flow regulator. This restricter can be obtained in predrilled or blank form, subject to be drilled in the field. In blank form, it will pass no fluid. However, in the field, the 100% capacity required of the axial flow regulator can be determined and suitable holes drilled in the blank to obtain the carefully tailored restrictive capacity required. This apparatus thus incorporates a surrounding sleeve which shoulders against the axial flow regulator and which blocks the annular flow space through it. Accordingly, a standard axial flow regulator which can be readily obtained off the shelf at supply stores can then be adapted to have a 100% capacity which matches a value less than the manufactured capacity. The reduced flow capacity then becomes the maximum capacity of the device. Moreover, the restricter of this disclosure enhances the structural support of the central streamlined plug or barrier which induces the flowing fluid to divert into the annular regulated space.

Should it be necessary to change the capacity of an axial flow regulator in the field, the device of this disclosure can be readily drilled on the spot with a number of small holes. Through the use of suitable charts, the flow capacity of the reducer of this disclosure can be determined and modified in the field. Moreover, such modifications can be accomplished without dismantling the pipeline other than to obtain access to the downstream side of the axial flow regulator.

The present apparatus therefore has one object, namely the modification of axial flow regulators. The restricter of this disclosure is manufactured in blank by manufacturing a central member within a cylindrical sleeve or surrounding skirt which anchors the equipment in place. The transverse central member is built to conform with and seat against the axial plug which diverts the fluid flow into the annular flow space where the flow is regulated. Usually, the restrictors are predrilled to give a capacity specified by the customer at the time of order.

This device is further summarized as being an adapter in which a selected number of holes can be readily drilled to specify the 100% flow capacity of the device.

BRIEF DESCRIPTION OF THE DRAWINGS

In order that the manner in which the above recited advantages and objects of the invention are attained, as well as others, which will become apparent, can be understood in detail, more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

The only drawing is a sectional view through an axial flow regulator which has been enhanced with the addition of the adapter of the present disclosure as depicted on a diametric sectional line.

DETAILED DESCRIPTION OF THE PREFERRED EMBODIMENT

Attention is first directed to the drawing where the numeral 10 identifies an axial flow regulator. It is support equipment for the adapter of the present disclosure, that adapter being identified generally by the numeral 12 on the righthand side of the sectional view. This apparatus is installed in a fluid flow line. As an example, it can be used to regulate the flow of natural gas in a large line, perhaps a nominal 8" line. Assume for purposes of this disclosure that the line is an 8" line and further assume that the fluid is natural gas being delivered at a pressure of 500 psi in the mainline. Assume further that the regulator is held in the full open position at which circumstance the downstream flow must have a specific controlled pressure. Assume further that the restricter 12 defines 100% for the restricter with the regulator full open which 100% value represents only 10% of the normal capacity of the regulator. To this end, a specific number of holes at distributed locations around the adapter will be drilled to thereby obtain a flow rate which will be zero to 100% of the adapter. This then enables the regulator 10 to regulate the flow rate in the intended fashion through 100% of its range of deflection. In other words, the regulator can operate across its full range of permissible operation and the downstream controlled pressure and flow rate will be adjusted by its operation in the intended manner. This reduces the axial flow regulator in operation in a selective manner. Quite obviously, other scale factors can be applied. Holes are least expensive to form. Other shaped openings including slots also operate well.

The adapter 12 will be described after some of the operational features of the axial flow regulator are set out. The axial flow regulator that is shown here is a representative axial flow regulator which is manufactured by the American Meter Division of Singer Manufacturing Company. This device includes a surrounding body 14 which is clamped between flange plates on installation in a pipeline. An external sleeve 16 is positioned around the apparatus. The sleeve 16 is fitted around a hollow cavity or chamber which is formed fully about the hollow body and is preferably hollow on the interior with selected passages formed in it to route fluids as will be described. The encircling structural member 16 is a non-yielding or yielding backing for a sleeve 18 formed of resilient material. The sleeve 18 is a elongate sleeve or tubular member of resilient material which is locked in place. It is locked at both marginal edges to secure it in place to thereby define a fluid receiving cavity 20. The cavity 20 is an encircling donut shaped cavity which is defined on its inner face by the resilient sleeve 18. The outer surface is defined by the encircling structural member 16. The body 14 is constructed of multiple components which assemble together to lock the sleeve 18 in position, the sleeve functioning as an expandable diaphragm.

The cavity 20 fully encircles the sleeve. When fluid under pressure is introduced into the cavity 20, the sleeve is deflected radially inwardly. As it deflects inwardly, it deflects against several ribs, there being an upstream cage 22 which is formed of a plurality of inwardly directed ribs, and there being additionally a downstream cage formed of ribs 24. These ribs constrain the sleeve against excessive protrusion. Moreover, the several ribs 22 and 24 defined interstical spaces therebetween for an axial flow space which is generally identified by the numeral 26. This is shaped in the form of a surrounding annulus adjacent to the expandable diaphragm or sleeve 18. The sleeve normally fits tight on the cage. It is in tension to cause a positive shutoff when pressure is equal on both sides of the sleeve. The regulator begins to open when pressure outside the sleeve allows the sleeve to expand the sleeve away from the cage. The flow space 26 has a calculated 100% capacity. This capacity (before installation of the adapter 12) sets out the maximum limit for the axial flow regulator 10. Moreover, this flow space extends around or adjacent to a center streamlined plug shown generally at 30. The plug 30 is a circular body which is captured by the ribs 22 and 24 defining the two cages. Moreover, the central plug is streamlined to divert flow toward the surrounding annulus. It is held in position by the ribs 22 and 24 which clamp the central plug. The plug is formed of symetrically arranged hemispheres. The upstream side is formed of the component 32 while the downstream member is formed of the similar hemisphere 34. They are similar in all regards as a convenience in manufacturing. They are joined together by central bolt 36. The bolt 36 fastens through both and secures them together. In ordinary circumstances, the bolt 36 terminates at a nut on the downstream side which secures the two hemispheres together.

The two hemispheres define an encircling edge or face which contacts against the resilient sleeve 18. This closes the annular flow space when this is desired. The present apparatus is an adapter 12 which is preferably fabricated in blank form, that is, without drilled holes. It includes a surrounding peripherally located cylindrical skirt 40. The skirt 40 fits within the housing 14. It preferably telescopes into the housing 14 from the downstream side. Moreover, it is dimensioned so that it slides snuggly into this opening. Ideally, a close but friction free fit is desirable. The flow regulator has a number of ports and passages formed in it for handling fluids for operation of a flow regulator. For openings on the downstream side, it is desirable to drill a hole through the cylindrical skirt 40 and to further locate a fitting 42 therein. The fitting 42 is an externally threaded fitting which merely extends the passage 44 in the housing 14. The fitting 42 opens into the downstream side, and delivers downstream pressure through the passage 44. The fitting 42 serves as a lock bolt to anchor the adapter 12 into position. It is preferably equipped with an enlarged head and is threaded into the adapter at a set of threads to align the fitting 42 with the passage 44. The fitting 42 thus serves a dual function when installed in the illustrated manner.

The adapter 12 includes a central transverse plate 46. The plate 46 is a solid plate which covers over the entire central axial portion. It is contoured to conform with or seat against the plug 30. Moreover, it matches the plug in shape or in profile and therefore has a mating face or surface. It is constructed with a central tapped or threaded hole to receive the bolt 36, the tapped opening being identified at 48. It has an upstream face with seals located at 50 and 52. The seals 50 and 52 seal against the plug 30.

The seals fit snuggly against the plug define an area where pressure fluid may accumulate against a pressure differential. This pressure is relieved by incorporating a small hole at 54. The hole 54 relieves the annular gap between the plug 30 and the adapter 12. Moreover, it reduces this area to the downstream pressure under all operating circumstances. This pressure relief hole 54 can be duplicated at two or three locations to provide relief symetrically around the plug 30.

The skirt 40 is manufactured in blank, that is, with no holes in it. The numeral 56 identifies one of several holes which are formed in it at the factory. They are preferably distributed around the cylindrical skirt 40. The several holes 56 provide a passage from the upstream to the downstream side of the regulator 10. These several holes collectively define 100% capacity at a specified level which is less than the maximum permissible flow rate of the regulator 10. The several holes 56 define this capacity with the regulator in the full open condition. The holes and their cumulative cross-sectional area define a scale factor for the adapter 12. The number of holes is thus varied so that the adapter 12 can be modified in the field to any desired maximum flow rating.

The adapter 12 is thus constructed with no holes formed in it and the holes 56 are then drilled once the capacity has been determined. The holes 56 are preferably distributed evenly around the periphery. As an example, they can be spaced evenly in one, two or three rows. Quite obviously, the total throughput on the device is adjustable within limits dependent on the size of the holes and the aggregate cross-sectional area of them. Preferably, when the holes are drilled, they are deburred at both ends to provide streamlined flow through the passages.

In operation, the adapter 12 is installed adjacent to the axial flow regulator 10 in the following manner. The axial flow regulator is assumed to be installed in the pipeline, and the pipeline is opened on the downstream side to obtain access to the flow regulator. The threaded bolt 42 is specifically installed to continue the passage 44 and to also anchor the sleeve in location.

The device is installed after the holes 56 have been drilled. Assume as an example that the holes have a diameter of 0.125 inches and they are spaced evenly about the cylindrical sleeve 40. They are drilled and deburred prior to installation. After drilling, the adapter is positioned in the illustrated location and fastened with the threaded bolt 42.

The ribs extend radially inwardly to support the centralized plug and also align the sleeve on the exterior of the ribs. The ribs can be angled to avoid the adapter or to fit in notches against it. If so, the cylindrical adapter 12 is notched at locations to match the ribs 24. Ordinarily, between three and thirty ribs define the surrounding cage. They are spaced at symmetrical angular locations, namely every 90 degrees or 120 degrees ideally up to about ⅛ inches. Installation also involves removing the nut from the bolt 36 and threading the bolt 36 into the tapped hole 48. This anchors the adapter in location relative to the central plug 30 and the ribs which surround the plug. Pressure relief across the adapter is possible by isolating the upstream face with the O-ring 52. Both faces of the adapter are exposed to a common pressure by the hole 54.

If desired, the restricter can be removed and the holes filled if there are too many holes. Brazing is a suitable technique to fill the holes. They can be brazed and redrilled. The number of holes can be altered by drilling the second and third rows. Some variety in the application of the adapter is thus permitted.

From the foregoing, the use and construction of the restricter 12 will be understood in conjunction with the illustrated embodiment of axial flow regulator. The regulator may have a differing plug construction and to that end, the transverse plate member which closes over the axial passage may be configured differently so that it mates with the plug. Preferably, it remains supported in the surrounding sleeve-like insert which positions against the plug.

While the foregoing is directed toward preferred embodiment, the scope is determined by the claims which follow.

I claim:

1. An apparatus including a restrictor for installation on the downstream side of an axial flow regulator which flow regulator includes a central plug diverting fluid flow into an annular space thereabout, said regulator having an annular housing having inlet and outlet body elements received therein, said body elements each defining a plurality of integral spaced ribs forming opposed cage elements for retention of said central plug therebetween, said body elements defining cylindrical inlet and outlet openings, locking opening means being defined in the downstream one of said body elements, the restrictor comprising:

a surrounding cylindrical sleeve defining a solid circumferential wall forming a close fit within said outlet opening of said downstream body element a plurality of fluid flow openings being formed in said cylindrical wall to thereby define a maximum throughput capacity, said restrictor further including a generally conical central closure member being integral with said cylindrical wall and extending across and within said cylindrical wall to close off an axial flow path there through an annular seal groove being formed in the outer peripheral portion of said restrictor and opening toward said plug, seal means received in said seal groove and establishing a seal between said restrictor and plug, locking means extending through said cylindrical wall and into said locking opening and securing said restrictor in assembly with said downstream body element.

2. The apparatus of claim 1 including joinder means securing said restrictor in sealed assembly with the central plug of the axial flow regulator.

3. The apparatus of claims 1 or 2 further including inner annular seal means on the upstream side of said central closure of said restrictor establishing an inner seal between said central plug member of the axial flow regulator and said central closure.

4. The apparatus of claims 1 or 2 further wherein a lateral locking hole is formed in said cylindrical wall, said locking opening means being defined by a preexistent flowpath in the regulator which flow path extends through said downstream body element and opens into the downstream side of the flow regulator, said locking means being a threaded lock means which fastens said wall in place, said threaded lock means defining a flow passage therethrough in communication with said preexistent flowpath.

* * * * *